(12) United States Patent
Walker et al.

(10) Patent No.: US 8,249,562 B2
(45) Date of Patent: Aug. 21, 2012

(54) METHODS, APPARATUSES AND SOFTWARE FOR PROVIDING THE SERVICE CONTROL NODE WITH FILTER CRITERIA

(75) Inventors: John Michael Walker, The Hague (NL); Alfredo Gonzalez, Rivas Vaciamadrid (ES); Manuel Cardeno, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

(21) Appl. No.: 12/524,031

(22) PCT Filed: Jan. 24, 2007
(Under 37 CFR 1.47)

(86) PCT No.: PCT/EP2007/050706
§ 371 (c)(1),
(2), (4) Date: Apr. 26, 2010

(87) PCT Pub. No.: WO2008/089845
PCT Pub. Date: Jul. 31, 2008

(65) Prior Publication Data
US 2011/0111734 A1    May 12, 2011

(51) Int. Cl.
*G06F 15/16* (2006.01)
(52) U.S. Cl. .................................. 455/414.1; 455/456.1

(58) Field of Classification Search ............... 455/414.1, 455/414.2, 456.1, 456.2
See application file for complete search history.

(56) References Cited

U.S. PATENT DOCUMENTS
2005/0108347 A1    5/2005  Lybeck et al.
2005/0213606 A1    9/2005  Huang et al.
2006/0291437 A1    12/2006 Naqvi et al.

OTHER PUBLICATIONS

3GPP SA WG2: "Digital cellular telecommunications system (Phase 2+); Universal Mobile Telecommunications System (UMTS); IP MUltimedia (IM) session handling; IM call model; Stage 2 (3GPP TS 23.218 version 7.4.0 Release 7)" 3GPP Technical Specification, Dec. 2006, pp. 1-61, XP014036288 paragraph [5.2.] paragraph [6.3.].
Telecom Italia: "C4-060623: The Dynamic Service Activation Information Feature" 3GPP TSG-CT WG4 Meeting #31, [Online] May 8-12, 2006 pp. 1-4, XP002463408 Retrieved from the Internet: URL:http://www.3gpp.org/ftp/tsq_ct/WG4-pro_tocollars_ex-CN4/TSGCT4_31_Sophia-Antipoli_s/TDocs/C4-060623.zip> [retrieved on Jan. 3, 2008] paragraph [DSAI.USE.CASE.N.3].

*Primary Examiner* — Sam Bhattacharya

(57) ABSTRACT

A method and apparatus in a telecommunication network for triggering services provided to a user. A service control node in the user's home network domain utilizes filter criteria, which may be derived from the user's user profile, to trigger the services. The service control node selects at least one filter criterion depending on the criterion's relevance to the user. Alternatively, the service control node is provided with at least one filter criterion not stored in the user profile.

7 Claims, 12 Drawing Sheets

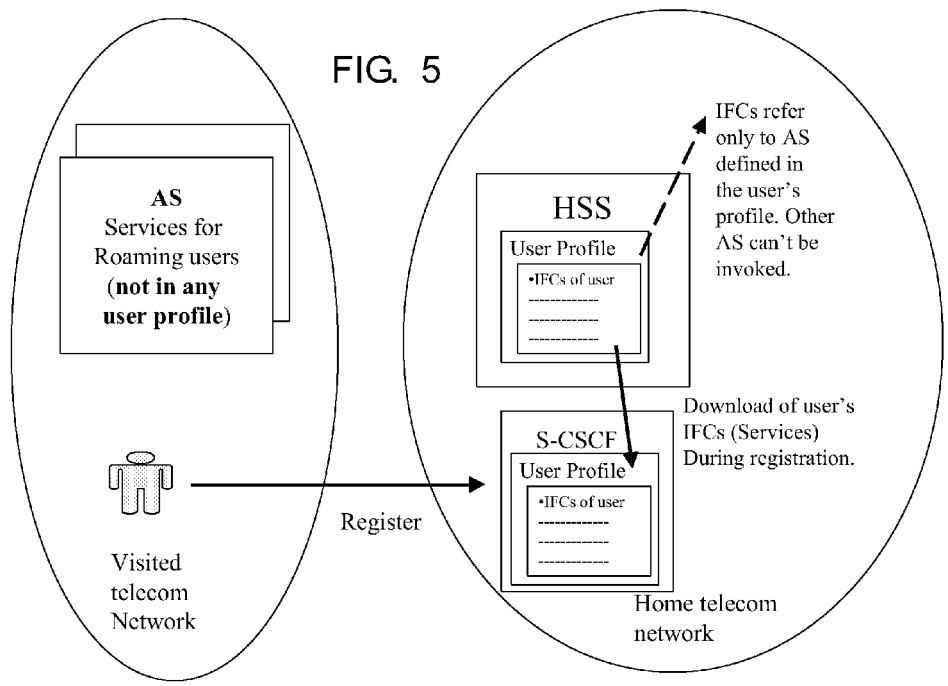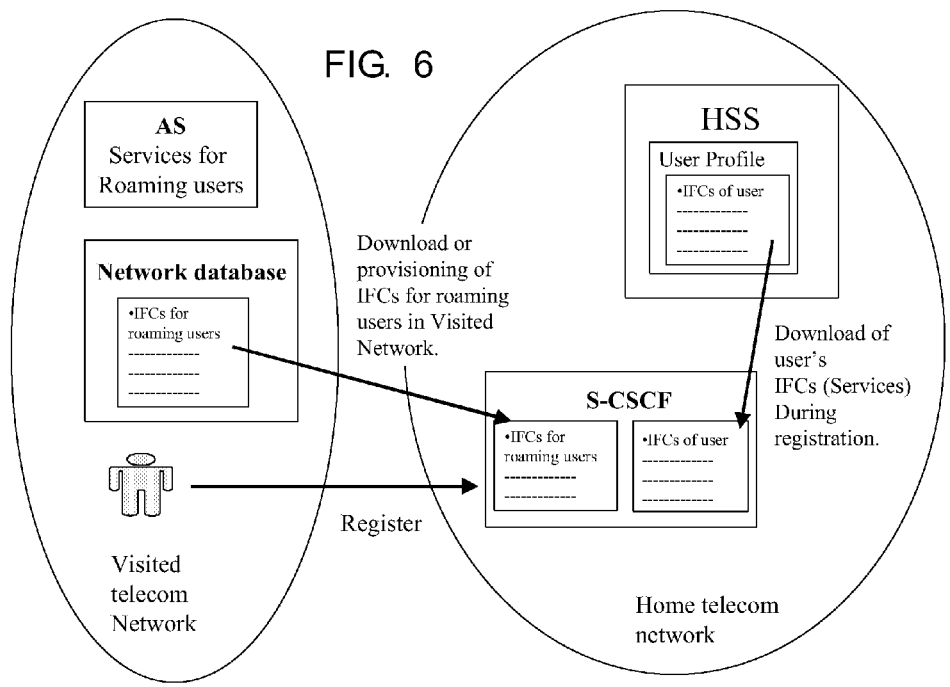

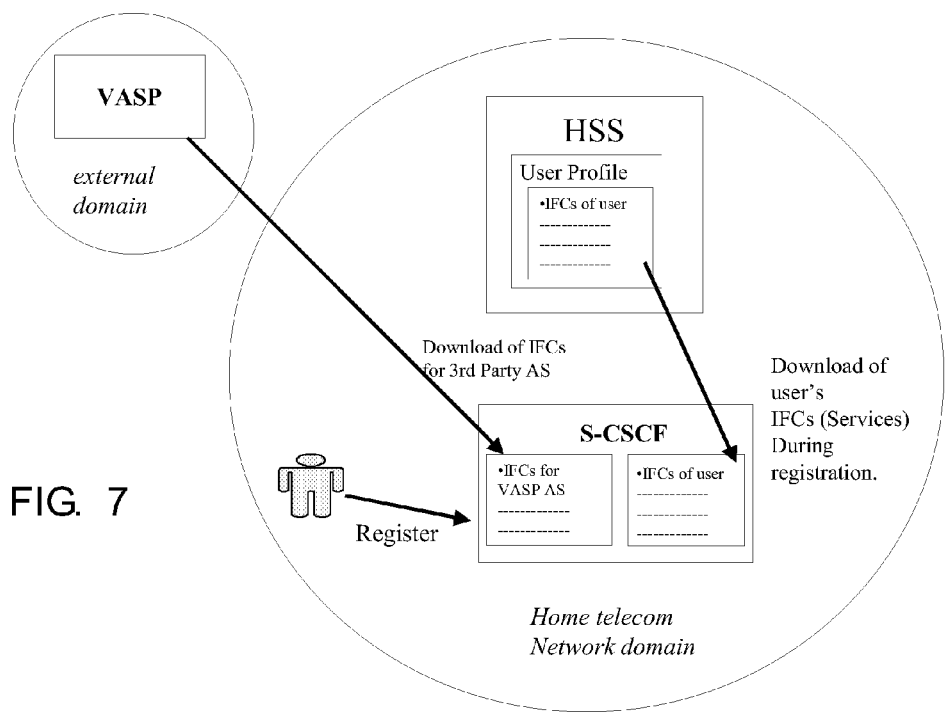
FIG. 7
FIG. 8
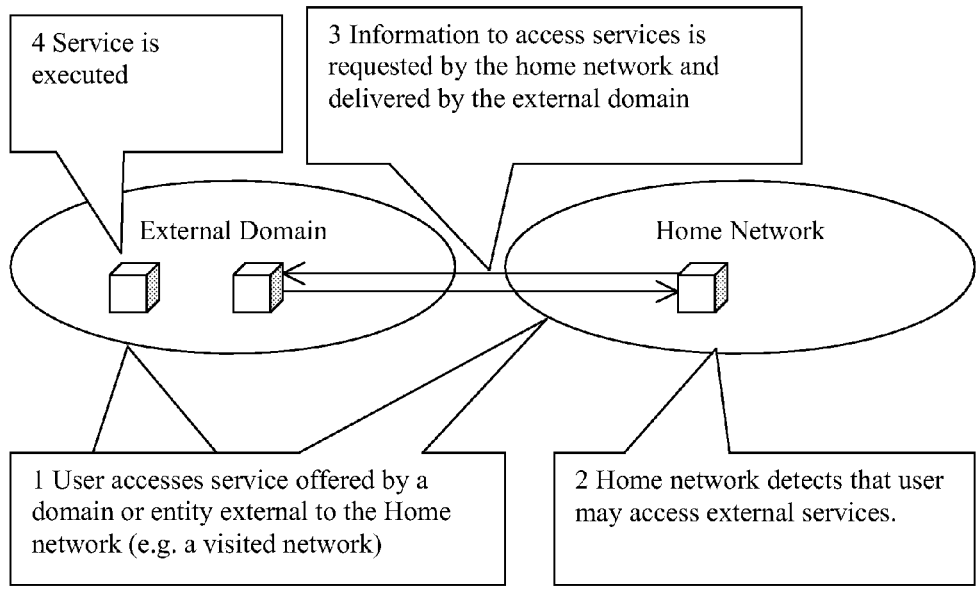

FIG. 14
IMS local services. Exchanging IFCs for local services in the visited network
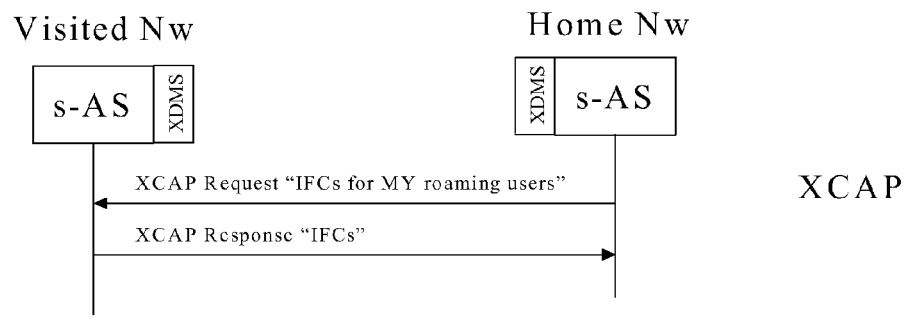
XCAP
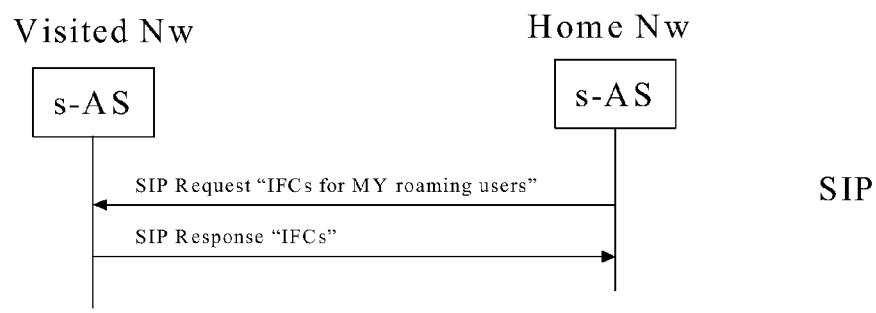
SIP IMS local services. Download local services IFCs Dowload Dynamic Profile Option 1

IMS local services. Download local services IFCs

Dowload Dynamic Profile Option 2

METHODS, APPARATUSES AND SOFTWARE FOR PROVIDING THE SERVICE CONTROL NODE WITH FILTER CRITERIA

BACKGROUND OF THE INVENTION

1. Field of the Invention

The present invention relates to a method and apparatus for use in a communications network, for example a Universal Mobile Telecommunications System having an IP Multimedia Subsystem.

2. Description of the Related Art

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the $3^{rd}$ Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Specific details of the operation of the UMTS communications network and of the various components within such a network can be found from the Technical Specifications for UMTS that are available from http://www.3gpp.org. Further details of the use of SIP within UMTS can be found from the 3GPP Technical Specification TS 24.228 V5.8.0 (2004-03).

FIG. 1 of the accompanying drawings illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) application server will determine the new terminating party to which a call to a given subscriber will be forwarded. In the case that an IFC indicates that a SIP message received at the S-CSCF should be forwarded to a particular SIP AS, that AS is added into the message path. Once the SIP message is returned by the AS to the S-CSCF, it is forwarded on towards its final destination, or forwarded to another AS if this is indicated in the IFCs.

According to 3GPP Multimedia standardisation, multimedia signalling and control is carried out always through the user's home network even in the case of a user roaming in another visited network. In this context, "roaming" is concerned with IMS roaming; this is not related with roaming between radio cells, but roaming between IMS Core Network elements. This means that the P-CSCF, the first IMS element contacted by the subscriber, doesn't belong to the IMS home operator of the subscriber (the UMTS or GPRS operator could be the same so there wouldn't be roaming at the radio level).

3GPP defines in Chapter 4.2.3 of [3GPP TS 23.228 V7.4.0 (2006-06) TS Group Services and System Aspects; IP Multimedia Subsystem (IMS); Stage 2 (Release 6)] how to support roaming users and its implications on service execution for said users. The following text has been extracted from Chapter 4.2.3 of 3GPP TS 23.228 v7.0.0 to illustrate current state of the art:

"The architecture shall be based on the principle that the service control for Home subscribed services for a roaming subscriber is in the Home network, e.g., the Serving-CSCF is located in the Home network."

There are two possible scenarios to provide services:

Via the service platform in the Home Network. This is illustrated in FIG. 2 of the accompanying drawings.

Via an external service platform (e.g. third party or visited network). This is illustrated in FIG. 3 of the accompanying drawings.

The external service platform entity could be located in either the visited network or in the 3$^{rd}$ party platform.

The roles that the CSCF plays are described below.

The Proxy-CSCF shall enable the session control to be passed to the Serving-CSCF.

The Serving-CSCF is located in the home network. The Serving-CSCF shall invoke service logic.

A Proxy-CSCF shall be supported in both roaming and non-roaming case, even when the Serving-CSCF is located in the same IM CN Subsystem.

Chapter 4.2.4 of 3GPP 23.228 v7.0.0 describes the ISC interface (IP Multimedia Service Control interface) between the S-CSCF and the service platform (e.g. an AS).

An Application Server (AS) offering value added IM services resides either in the user's home network or in a third party location. The third party could be a network or simply a stand-alone AS.

The Serving-CSCF to AS interface is used to provide services residing in an AS. Two cases were identified:

Serving-CSCF to an AS in Home Network.

Serving-CSCF to an AS in External Network (e.g. Third Party or Visited).

The SIP Application Server may host and execute services. The SIP Application Server can influence and impact the SIP session on behalf of the services and it uses the ISC interface to communicate with the S-CSCF.

The Application Server Subscription Information is the set of all Filter Criteria that are stored within the HSS for service profile for a specific user. Initial Filter Criteria (IFC) are stored in the HSS as part of the user profile and are downloaded to the S-CSCF upon user registration, or upon a terminating initial request for an unregistered user if unavailable. They represent a provisioned subscription of a user to an application. After downloading the User Profile from the HSS, the S-CSCF assesses the filter criteria to determine the need to forward SIP requests to Application Servers. Initial Filter Criteria are valid throughout the registration lifetime of a user or until the User Profile is changed.

An informative example of an IFC is provided in 3GPP 29.228 v6.8.0, and this is extracted and shown in FIG. 4 of the accompanying drawings.

The absence of Trigger Point instance will indicate an unconditional triggering to Application Server.

FIG. 4 shows that an IFC includes both the Application Server that will provide the service and the trigger point (or condition) that will make the service to be executed. As stated before, the Home Operator provisions IFCs and thus all the information belongs to the Home Operator, with the particularity that the Defined Application Server can be a Visited one.

By means of Camel, it is possible to provide mobile users access to home operator services in GSM/GPRS/UMTS. HLR provide Camel Subscription Information (CSI) to the network elements that may trigger a service. Those CSIs include, as in the case if IFC in IMS, the services trigger conditions and the identification of the gsmSCF that will execute the service.

According to [3GPP TS 22.078 v7.4.0 (2005-06) TS Technical Specification Group Services and System Aspects; Customised Applications for Mobile network Enhanced Logic (CAMEL); Service Description; Stage 1 (Release 7)], CAMEL Subscription Information is provided by the HPLMN operator by administrative means (as in the case of IFCs for IMS).

The following reference might also be considered in relation to the above: 3GPP TS 29.328 V6.5.0 (2005-03) TS Group Core Network; IP Multimedia Subsystem (IMS) Sh interface signalling flows and message contents; Release 6.

The applicant has identified several problems with the existing solutions, which will now be outlined.

The current solution considers that Initial Filter Criteria (IFC) are stored as part of a user's profile; the IFC is triggered if a certain condition is fulfilled.

The current solution does not consider IFCs that can be defined for services that affect groups of users, such as users that are in a given a location, without having first included the IFC in the user profiles in the HSS.

The previous implies that IFCs cannot be downloaded dynamically if certain conditions are fulfilled (e.g. user's position allows using a related service, if user is roaming and is allowed to consume local services in a visited network) to a serving entity (S-CSCF).

Regarding roaming in particular, the current solution is built on the basis that service control for Home subscribed services for a roaming subscriber is located in the Home network. Thus, it is the home network that controls the execution of services, which are just defined by the home operator.

Thus, the user is provided with all the possible services he has access to and these ones are controlled by the S-CSCF that is aware of said services at registration time (it may also be aware if there are some changes due to operational procedures).

But in reality it will be quite unlikely that an operator is aware about all the details of a service provided by a second operator or an external domain and this is even more critical when the operator requires the knowledge about the services offered by every operator with a roaming agreement or an agreement with third parties in general.

Consequently, the IMS user in a roaming situation will be able to access in fact only to a reduced set of the local services provided by the visitor operators.

FIG. 5 of the accompanying drawings shows the current situation and the ensuing problems, which are considered to be as follows:

The IFCs in 3GPP IMS are always part of a user profile belonging to a home network and stored in a Home Subscription Server.

Upon registration, all IFCs in a user's profile are downloaded (over the Cx interface) to the allocated S-CSCF as part of the user's profile. IFCs not in the user's profile are not even considered.

Visited Networks may wish to offer local services to roaming users (e.g. special rates, optimal resource allocations, use of local dialling plans, etc). These services need to be triggered by an IFC.

Since these IFCs are offered by a visited network only to roaming users, it is too costly to store them in ALL user profiles in the HSS (for all users in all networks), in case they roam.

The previous considerations are also applicable to IFCs belonging to any external domain in general (not just a visited operator) that is not the user's home operator.

Hence, at this moment there is no means by which the visited network or an external domain can send (either dynamically or via provisioning) a set of IFCs that apply to any user and are only executed in said case, without associating them to a user profile.

Table 1 below, extracted from 3GPP 23.228 v7.0.0, shows the information that is currently stored both in the HSS and in the S-CSCF before, during and after registration. IFCs that are not part of the user profile stored in the HSS are not considered to date.

TABLE 1

| Node | Before Registration | During Registration | After Registration |
|---|---|---|---|
| HSS | User Service Profile | P-CSCF Network ID | Serving-CSCF address/name\ |
| Serving-CSCF (Home) | No state information | HSS Address/name User profile (limited - as per network scenario) Proxy address/name P-CSCF Network ID Public/Private User ID UE IP Address | May have session state Information Same as during registration |

In general, this applies to external application servers (external service platforms) that wish to define Initial Filter Criteria that dynamically apply to a user (or set of users) without necessarily including the related IFC as part of the user's profile.

It is desirable to address at least some of the above identified issues.

SUMMARY OF THE INVENTION

The basic concept of an embodiment of the present invention will now be described.

IFCs defined by the Visited operator or External Service Platform are assigned to the user. The information contained in this IFC, both Application Server and service trigger conditions, are both controlled by the visited operator or External Service Platform instead of the Home Operator as the 3GPP standard presently states.

Two scenarios will now be considered.

1. Solution when IFC is defined by a Visited Network (FIG. 6)

Since the Home Operator according to 3GPP controls access to services, the Home Operator network in this solution also controls the access to local services offered by the visited network. The Home Operator will have a specific Application to control access to local services to its roaming users offered by visited networks. This requires that the Visited Network informs the specific Application in the Home Network of the available local services that will be offered to roaming users.

Due to the fact that execution of user services is based on the IFC of the subscribers then the execution of local services will be based as well on this concept. Local services are temporary (they depend on the visited operator network) so the associated IFC have to be dynamic in this case; note that the current state of the art does not consider usage of IFCs that are dynamically downloaded.

A new specific application controlling the access to local services takes care of handling dynamic IFCs through specific procedures (either update in HSS which in turns updates corresponding S-CSCF or direct update of the S-CSCF).

Once the S-CSCF is updated with the IFC for the local services, the execution of these is possible. The result should be that a roaming user would be able to seamlessly access and consume services in the local network. In addition, network resource optimisation is achieved.

The final result is that FIG. 5 described above is modified in the manner shown in FIG. 6.

FIG. 6 shows the S-CSCF including two sets of IFCs:

The IFCs downloaded from the user's profile in their home network (as in FIG. 5).

IFCs belonging to the visited network that apply to any user. These IFCs do not belong to any user profile. The master copy is stored by the visited network and sent to a S-CSCF in user's home network when required.

The Visted Networks's IFCs for roaming users can either be sent dynamically to the S-CSCF in the home network or can be provisioned. The former mechanism is described more in detail in the detailed description of embodiments of the present invention that follows this section.

Provisioning the Visited Network's IFCs in the S-CSCF is also a viable solution albeit simpler than dynamically sending the visited network's IFCs. The implementation of the idea described here simply requires a provisioning system to include and update the S-CSCF with the IFCs of each possible roaming network, that is, those networks with which the Home Network has a roaming agreement. The Home network will execute them when it detects that one of its subscribers is roaming in an associated network. Provisioning of IFCs for roaming users in the S-CSCF would require provisioning them for all possible Visited networks and would take up more memory and resources in the S-CSCF than required. It is therefore preferable, but not essential, that the S-CSCF dynamically receives the IFCs of the Visited Network only when the user is actually roaming in a given visited network.

2. Solution when IFC is defined by an External Domain in general (FIG. 7)

In general, this same concept of dynamically defined IFCs can be extended to other services besides roaming. One example is services offered by a Value Added Service Provider (VASP) where said VASP can be residing in an external domain.

As in the case of roaming users, these IFCs are not stored in each user's profile, but are dynamically written into the user's temporary profile in the CSCF. This is illustrated in FIG. 7.

The mechanisms and timing for this downloading might vary ranging from a pure periodical provision to one-time-provision after registration.

Aspects of the present invention will now be described.

According to a first aspect of the present invention there is provided a method for use in a telecommunications network in which a service control node in a user's home network domain uses filter criteria, for example derived from a user profile associated with the user, to trigger services provided to the user, the method comprising selecting at least one filter criteria for use at the service control node in dependence upon its relevance to the user.

The method may comprise providing the at least one filter criteria to the service control node.

It may be that at least one of the at least one filter criteria is stored in the user profile.

It may be that at least one of the at least one filter criteria is not stored in the user profile.

According to a second aspect of the present invention there is provided a method for use in a telecommunications network in which a service control node in a user's home network domain uses filter criteria, for example derived from a user profile associated with the user, to trigger services provided to the user, the method comprising providing the service control node with at least one filter criteria not stored in the user profile, or using at least one such filter criteria at the service control node.

The method may comprise providing the service control node with at least one filter criteria stored in the user profile.

The method may comprise selecting at least one of the at least one filter criteria in dependence upon its relevance to the user.

The method may comprise performing the selection at least partly at the service control node.

The method may comprise performing the selection at least partly at a node associated with the user profile.

The method may comprise determining the relevance at or near the time of selecting the at least one filter criteria.

The method may comprise determining the relevance in dependence upon the ability of the user to consume the service.

The method may comprise determining the relevance in dependence upon the user's location.

The method may comprise determining the relevance in dependence upon network-related information.

The method may comprise determining the relevance in dependence upon the capabilities of the user's communication device.

At least one of the at least one filter criteria may be associated with a domain external to the home network domain.

The at least one filter criteria associated with the external domain may be stored in the external domain.

The external domain may be a network domain visited by the user.

The at least one filter criteria associated with the external domain may be associated with an application server such as a Value Added Service Provider residing in the external domain.

The method may comprise retrieving at least one of the at least one filter criteria at the service control node.

A generic filter criteria derived from the user profile may be used to trigger the retrieval of the at least one filter criteria.

The method may comprise retrieving at least one of the at least one filter criteria at a node other than the service control node, and sending the at least one retrieved filter criteria to the service control node.

The other node may be a network node associated with the user profile.

The network may be a Universal Mobile Telecommunications System.

The network may comprise an IP Multimedia Subsystem, IMS.

The method may comprise performing at least part of the method during a procedure to register the user to the IMS.

The method may comprise providing the generic profile during the register procedure, and performing the retrieval during a subsequent procedure.

The subsequent procedure may be Session Initiation Protocol, SIP, session initiation procedure.

The service control node may comprise a Serving Call Session Control Function, S-CSCF.

The network node may be associated with the user profile is a Home Subscriber Server.

The filter criteria may be Initial Filter Criteria.

According to a third aspect of the present invention there is provided an apparatus for use in a telecommunications network in which a service control node in a user's home network domain uses filter criteria, for example derived from a user profile associated with the user, to trigger services provided to the user, the apparatus comprising means for selecting at least one filter criteria for use at the service control node in dependence upon its relevance to the user.

According to a fourth aspect of the present invention there is provided an apparatus for use in a telecommunications network in which a service control node in a user's home network domain uses filter criteria, for example derived from a user profile associated with the user, to trigger services provided to the user, the apparatus comprising means for providing the service control node with at least one filter criteria not stored in the user profile, or using at least one such filter criteria at the service control node.

According to a fifth aspect of the present invention there is provided a program for controlling an apparatus to perform a method according to the first or second aspect of the present invention or which, when loaded into an apparatus, causes the apparatus to become an apparatus according to the third or fourth aspect of the present invention. The program may be carried on a carrier medium. The carrier medium may be a storage medium. The carrier medium may be a transmission medium.

According to a sixth aspect of the present invention there is provided an apparatus programmed by a program according to the fifth aspect of the present invention.

According to a seventh aspect of the present invention there is provided a storage medium containing a program according to the fifth aspect of the present invention.

BRIEF DESCRIPTION OF THE DRAWINGS

FIG. 5 illustrates a current IFC and roaming scenario;

FIG. 6 illustrates a modification of FIG. 5 according to an embodiment of the present invention in a first scenario;

FIG. 7 illustrates a modification of FIG. 5 according to an embodiment of the present invention in a second scenario;

FIG. 8 provides an overview of an embodiment of the present invention;

FIG. 14 depicts two Application servers exchanging information in an embodiment of the present invention;

DETAILED DESCRIPTION OF THE PREFERRED EMBODIMENTS

An embodiment of the present invention makes use of the following general elements:
- A mechanism in the Home Network to decide that the user may access services in an external domain (visited network or offered by an external service platform or value added service provider).
- An entity in the Home Network Domain that is able to actively request to the external domain (Visited Network where the user is roaming, or to external service platform or value added service provider) those IFC that have to be used in order to trigger the services. This entity could be both a function in an existing IMS network element or a new network element hereinafter called Service Allowance Procedure in home network).
- An entity in the external domain (Visited Network Domain or part of the external service platform or value added service provider) that is able to deliver to the Home Network Domain the IFCs that are needed so that a user (roaming user in the case of a visited network) executes a service (hereinafter called External Service Allowance Procedure).
- The service in the external domain (visited Network Domain offered by an external service platform or value added service provider) provided to the user.

With the mapping of the basic elements and functions that build the solution, the resulting complete procedure that allows the execution of services defined by visited operators in roaming scenarios will be as described hereinafter. An overview diagram showing operation of an embodiment of the present invention is provided in FIG. 8.

Three options proposed to implement the working mechanisms will now be described.

Figure 1:
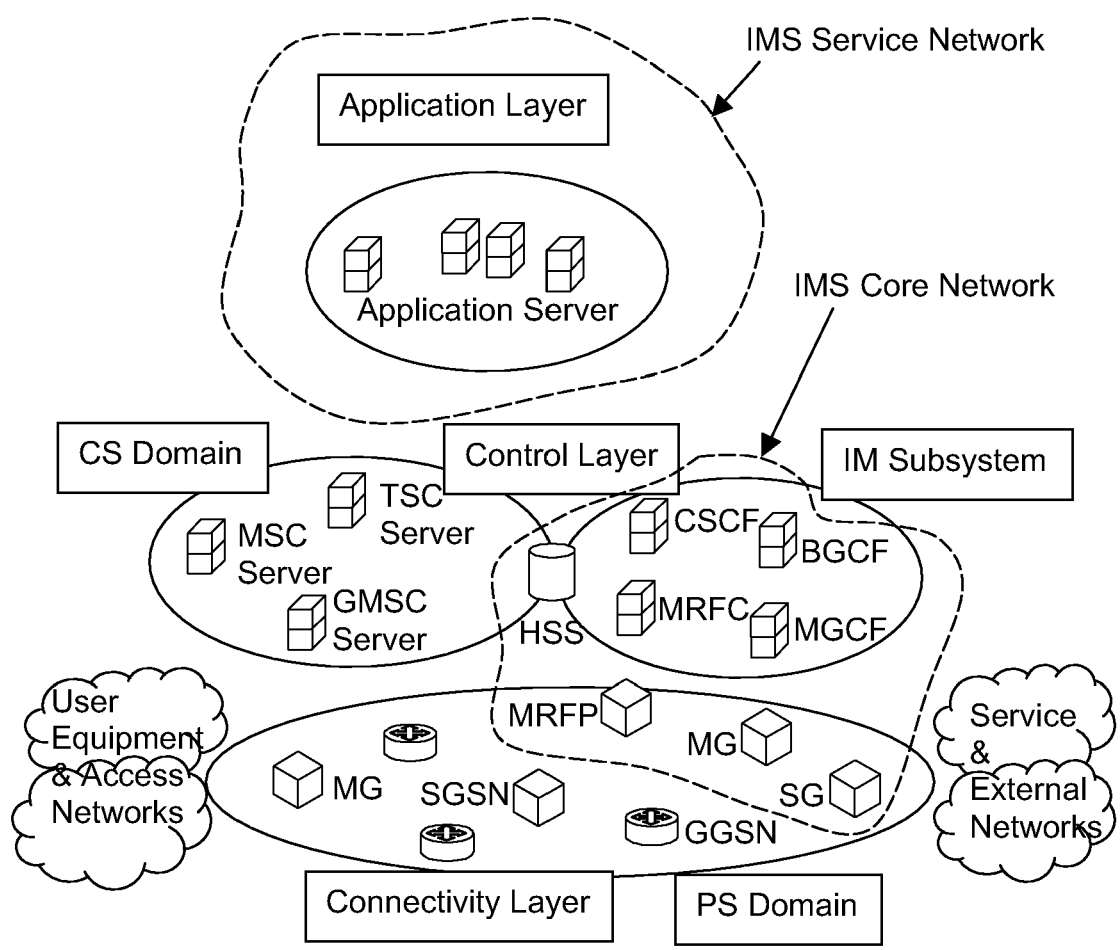
FIG. 1, discussed hereinbefore, illustrates schematically the integration of an IP Multimedia Subsystem into a 3G mobile communications system.
Figure 2:
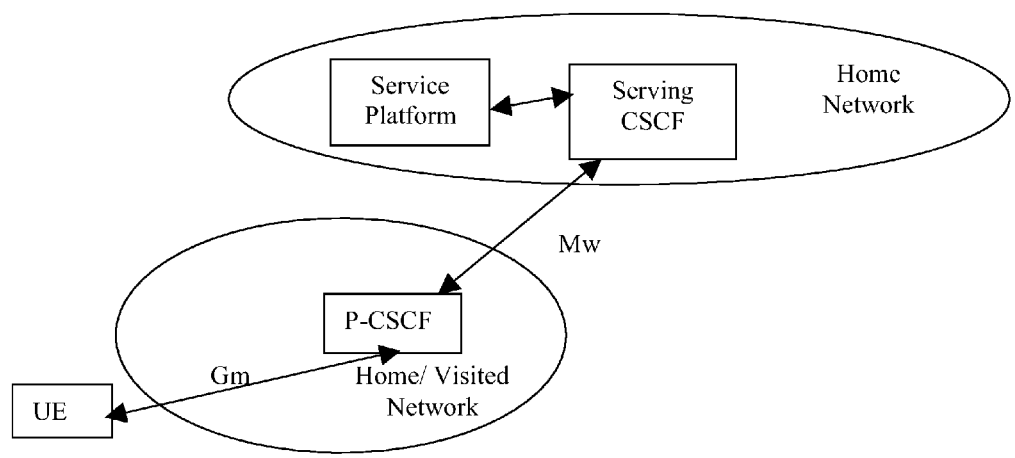
FIG. 2 illustrates a Service Platform in a Home Network.
Figure 3:
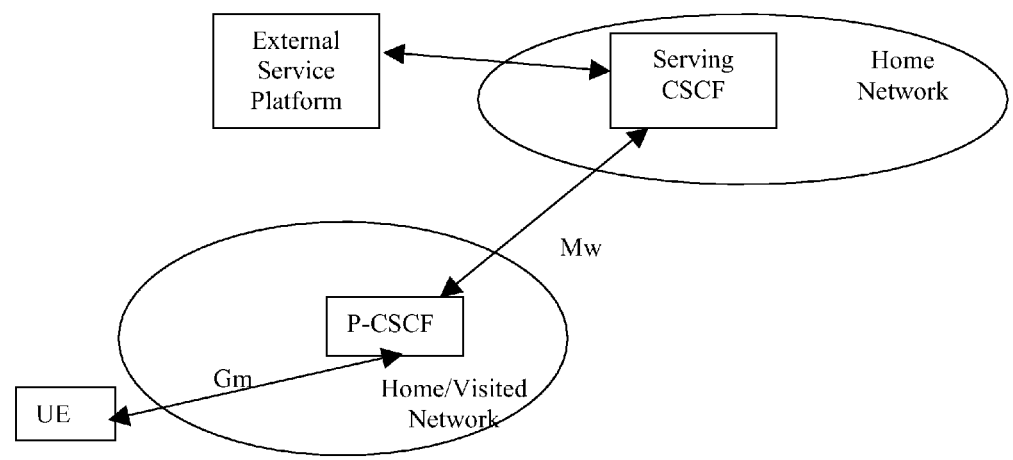
FIG. 3 illustrates an External Service Platform.
Figure 4:
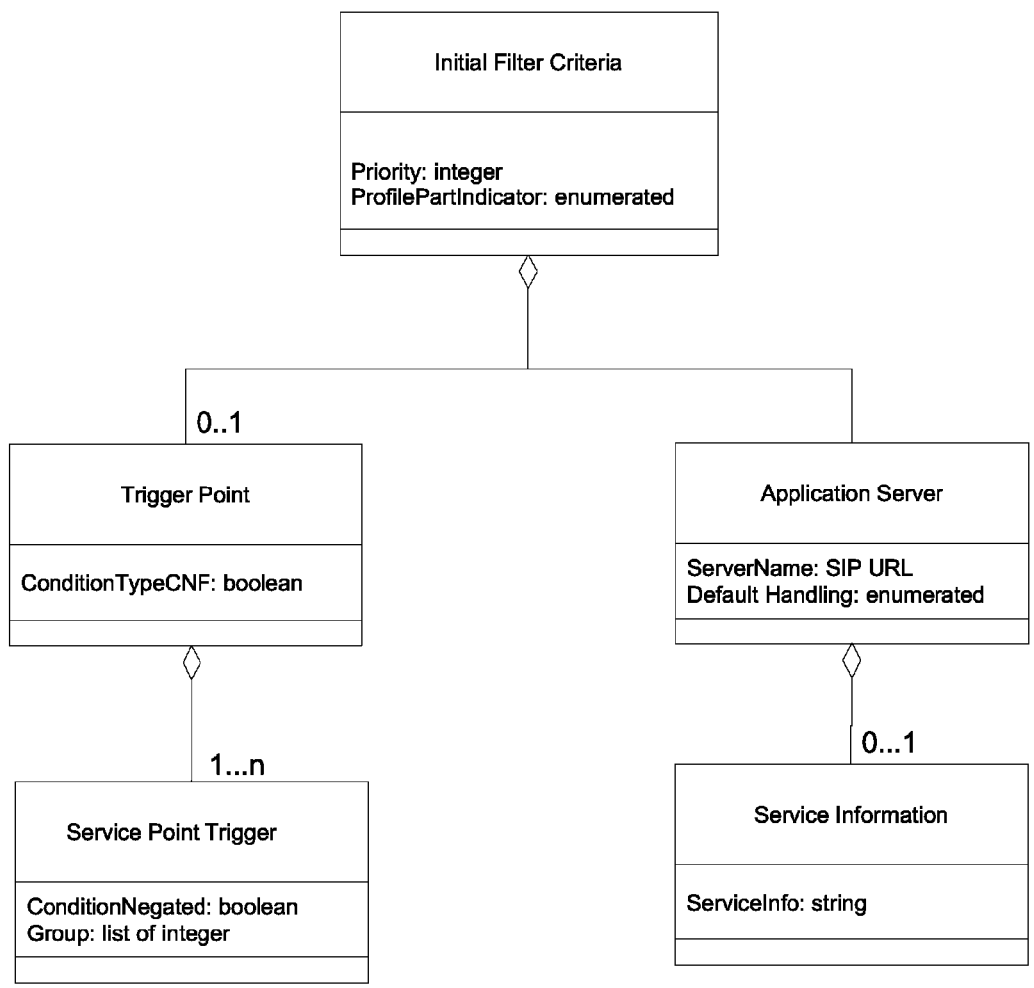
FIG. 4 shows an informative example of an IFC.
Figure 9:
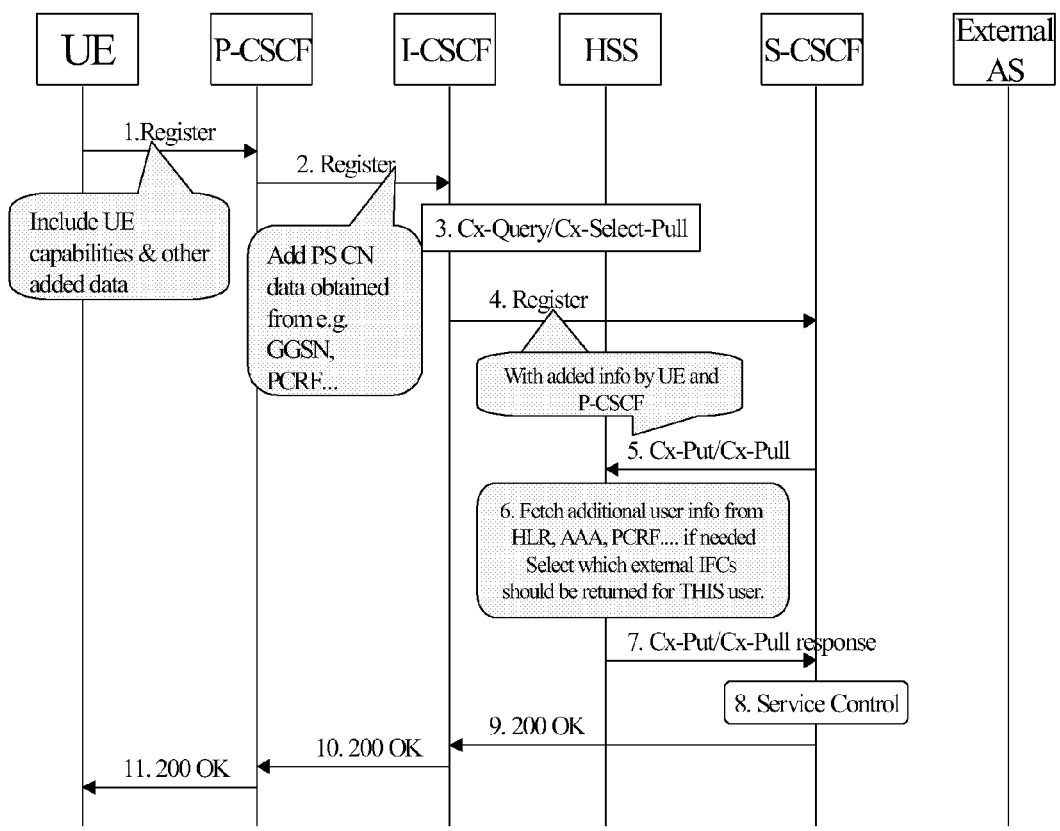
FIG. 9 illustrates a method according to an embodiment of the present invention.

1. IFCs stored in HSS, as part of user profile information (FIG. 9)

This scenario is the simplest of this set of flows related to selection of external IFCs. The user's IFCs are all stored in their user profile in the HSS. Only those external domain IFCs that apply are downloaded to the S-CSCF. This scenario is the least flexible of all and has the disadvantage that all external domain IFCs are stored in the user's profile with the resulting decrease in performance in the HSS.

This IMS registration flow modifies the current IMS registration in the following way:
- It adds UE data and network-related data to the SIP Registration message.
- The HSS in step 6 can dynamically decide which external domain IFCs should be downloaded to the S-CSCF. Note that this selection may also apply to the user's IFCs pertaining to the home domain as well.

Subsequent IMS signalling flows such as SIP invite occur as usual.

2. Selection of external IFCs based on information received during Registration; IFCs stored in External Domain AS Service Platform (FIGS. 10 and 11)

This scenario improves the previous scenario in that a user's IFCs belonging to an external domain AS service platform are actually stored by said external domain and not in the HSS as in the previous case. This implies that the HSS does not need to store all possible external domain IFCs for every user. It is enough if the HSS stores only one IFC per external domain at most, the rest of IFCs are stored in the external domain itself. Two sub-scenarios can be considered: (a) the HSS fetches the IFCs from the external domain and returns them to the S-CSCF; (b) the S-CSCF receives a generic IFC representing the external domain and as a result the S-CSCF fetches the user's IFCs from the external domain. These are depicted in FIGS. 10 and 11 respectively.

Figure 10:
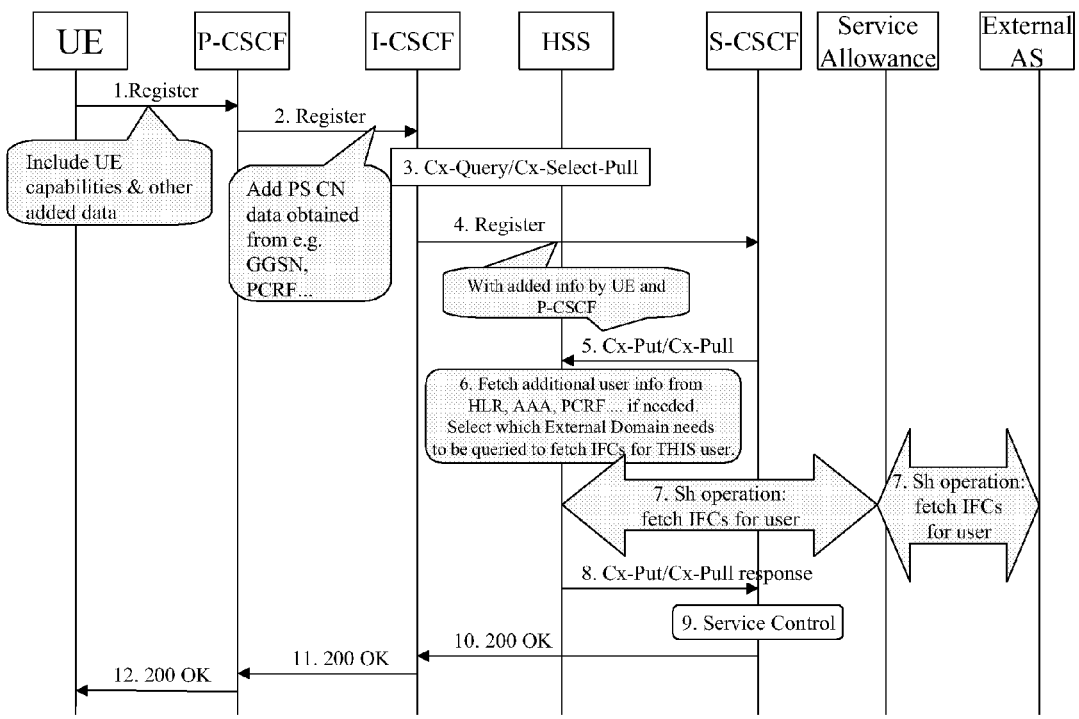
FIG. 10 illustrates a method according to another embodiment of the present invention.

In FIG. 10, the HSS decides (step 6) to retrieve external IFCs for the user. The HSS uses the Service Allowance Procedure to determine, based on added information in the Registration message and the user's profile, which external domain AS service platform stores the required user's IFCs. The HSS (step 7), through the Service Allowance Procedure, then fetches the user's IFCs from the external domain. Any database access protocol can be used here. To make use of IMS infrastructure, it is proposed to make use of the Sh protocol. Two possibilities exist:
- the HSS sends an Sh-Notify with a parameter indicating that IFCs for this user are needed; the AS responds with an Sh-Update, including the IFCs.
- The HSS implements an Sh-client and the AS implements an Sh-server side. The HSS reads the user's IFCs from the external AS.

Figure 11:
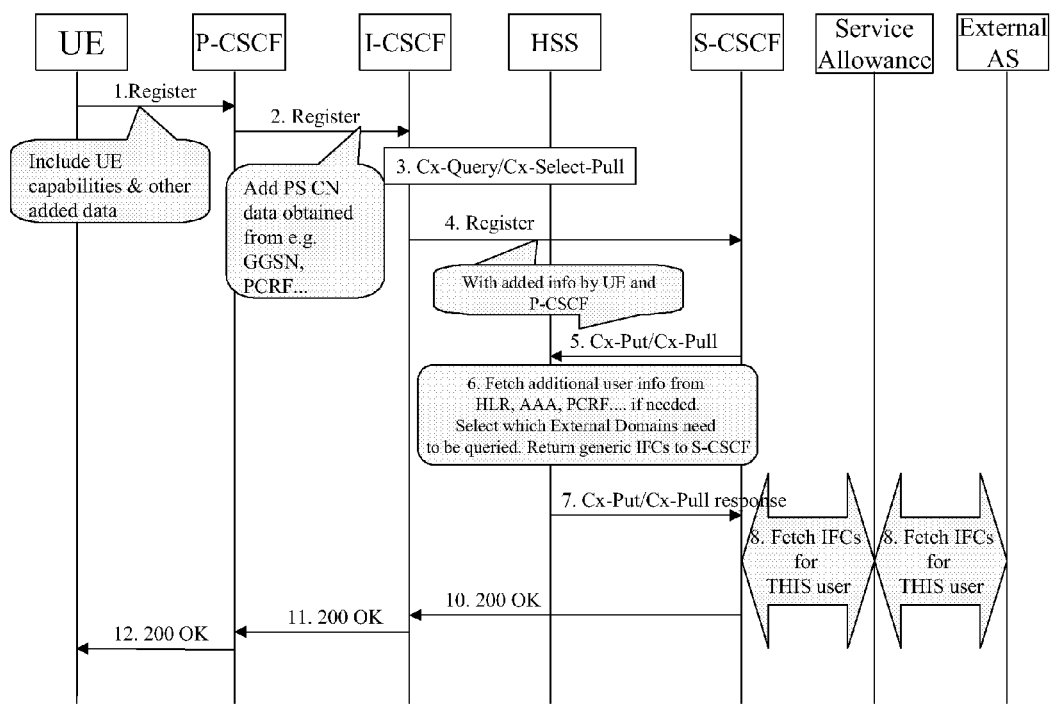
FIG. 11 illustrates a method according to another embodiment of the present invention.

FIG. 11 differs from FIG. 10 in that the user's IFCs are fetched by the S-CSCF, through the Service allowance Procedure. The HSS decides (step 6) that external IFC should be retrieved based on added information in the Registration message and the user's profile. The user's profile stores a generic IFC, which is returned to the S-CSCF in the Cx response (step 7), that is used by the Service Allowance Procedure to decide which external domain AS service platform stores the required user's IFCs. Said IFC is only triggered during registration (not during SIP re-registrations neither during SIP invites). Hence, the S-CSCF (step 8) requests the IFCs for this user towards the external domain AS, through the Service Allowance Procedure. Any database access protocol can be used here. To make use of IMS infrastructure, it is proposed to make use of the ISC interface. Following implementations are proposed although other might also exist:
- The S-CSCF sends a SIP INFO informing the AS that the user has IFCs in said external AS. The AS responds with the user's IFCs in the 200 OK message.
- The S-CSCF simply forwards the SIP register to the AS, and the AS responds with the user's IFCs in the 200 OK message. This alternative would be less elegant as it would make of the corresponding AS a sort of SIP Registrar, but in any case according to [3GPP TS 23.228 V7.4.0 (2006-06) TS Group Services and System Aspects; IP Multimedia Subsystem (IMS); Stage 2 (Release 6)], no particular limitations are imposed to this type of communications during the register phase.
- The use of new SIP methods to request for a third-party (in this case a end-user) information, e.g. a new SIP Query or SIP Fetch, SIP Pull, SIP Read like.
- The use of another known existing protocol like LDAP. Subsequent IMS signalling flows such as SIP INVITE occur as usual.

Figure 12:
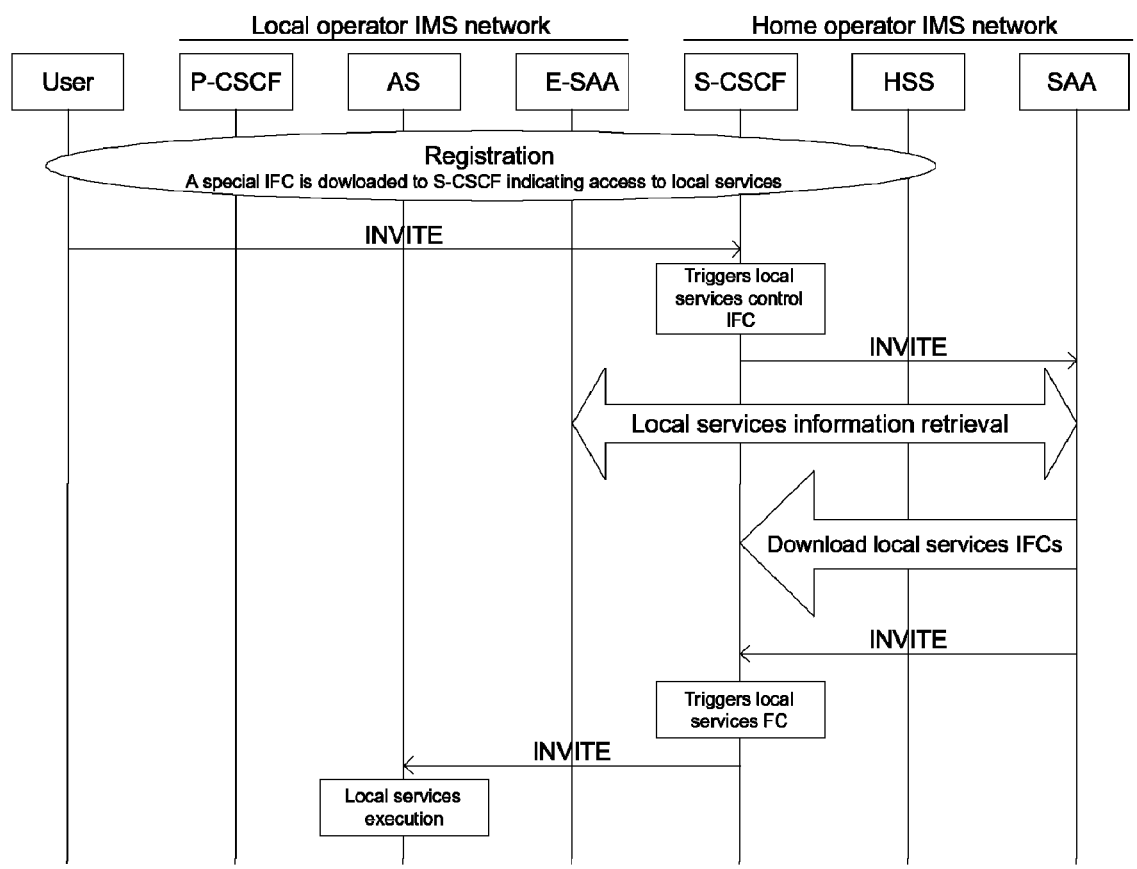
FIG. 12 illustrates a method according to another embodiment of the present invention.
Figure 13:
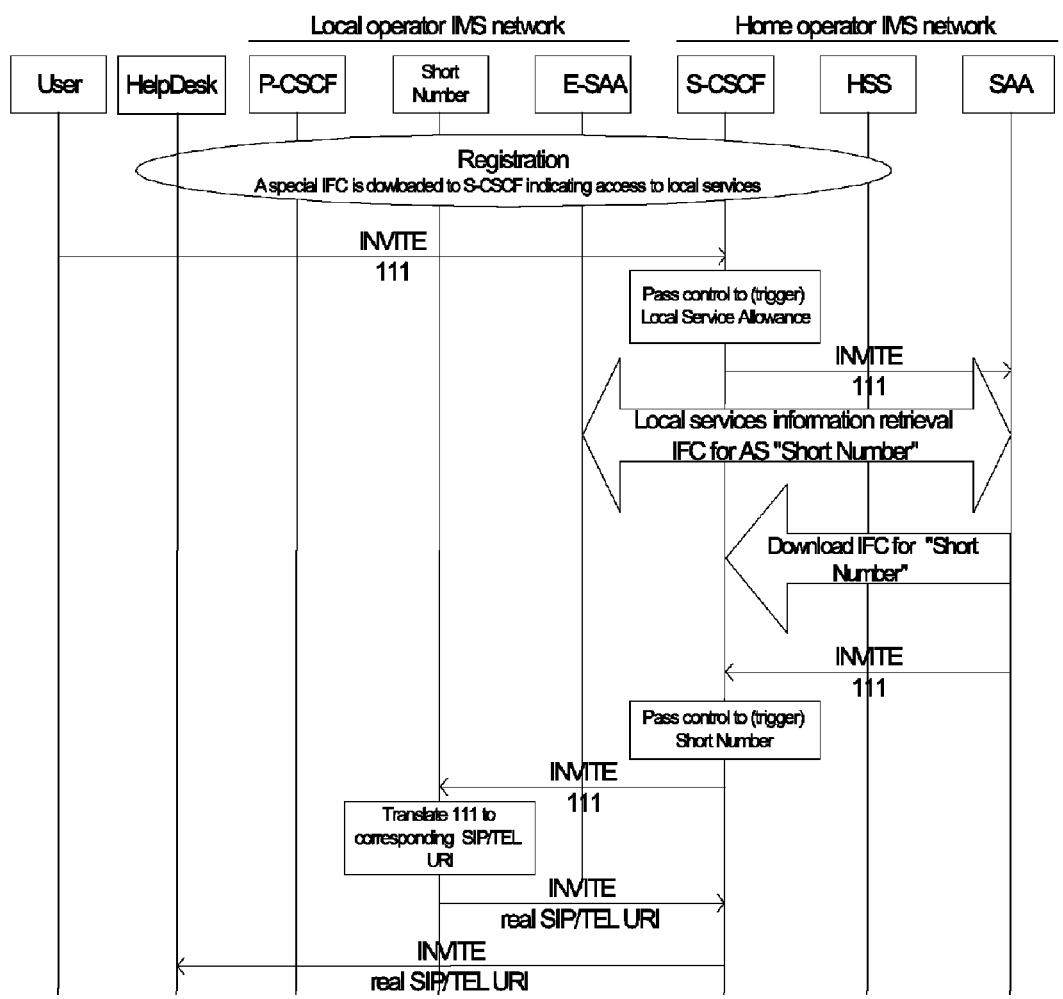
FIG. 13 illustrates a method according to another embodiment of the present invention.

3. External domain IFC stored in external AS service platform; external AS downloads required IFCs during a SIP session initiation (FIGS. 12 and 13)

In this scenario, a generic IFC is included in the user's profile and stored in the HSS indicating that the user has additional IFCs in a given external domain AS service platform. This IFC is downloaded to the S-CSCF during registration but it is not triggered until a SIP session initiation (e.g. INVITE) reaches the S-CSCF (note: this differs from the former case when an IFC could be triggered during Registration). The S-CSCF forwards the SIP session initiation request to the external AS which in turn starts a process to download the required IFCs back to the S-CSCF.

This procedure implies that the generic IFC used to download the IFCs from the external domain is triggered as soon as the conditions specified are met independently on potential previous executions of said IFC and consequently it may happen that the generic IFC is trigger even when the external IFCs have already been downloaded in S-CSCF.

This behaviour can be useful so that the external domain decide for each session what IFCs should be available for the user but in general it is not a good approach since it may increase the traffic without need. The following different approaches can be followed to mitigate this traffic increase in the network:

Maintaining state in the S-CSCF, e.g. one could include a Boolean value indicating if the generic IFC downloaded from the HSS (which forwards the SIP invite to the AS) has already been executed or not. Other implementations may also be possible. This mechanism implies that trigger for accessing external services is executed just once and thus traffic is not increased in the network but, on the other hand, provides little flexibility so that external IFCs can be updated by the local IMS operator of the external domain and besides implies certain specific intelligence regarding service execution in the CSCF.

Maintaining state in the local AS. The S-CSCF would trigger the IFC following just the conditions defined in the IFC and it is the local AS the one that has the intelligence to determine if it is needed to access to external IFCs. This decision may be based just on the existence of a previous access or other information related to the user, the services offered, etc. Moreover, the intelligence to determine how the service are executed is in an AS what is more logical for the IMS architecture. Nevertheless, this approach implies that it is still the Home Operator the only one deciding when external IFCs are updated and thus it is really the Home Operator the one deciding about the access to external services in each case.

The following steps are described with reference to FIG. 12:

(a) First, the user is registered in IMS following standard procedures. At the registration process the services available to the user are downloaded to the S-CSCF (in the form of IFCs). At this point, a specific service is downloaded for the user indicating that said user has access to local services when roaming in visited networks. This service shall be called hereinafter Services Allowance. The HSS may decide whether this Service Allowance IFC is downloaded to S-CSCF during the registration process.

(b) The user initiates a SIP session following standard procedures.

(c) S-CSCF realized it has to trigger the Services Allowance service in the Service Allowance Application. Note that S-CSCF has information regarding whether or not the user is roaming and in which network, which should have been provided during registration.

(d) The trigger of that service implies that the S-CSCF hands the control of the session to a specific Application Server in the home network, referenced as the Service Allowance Application.

(e) The Service Allowance Application in the home network contacts an application peer in the visited network, the External Service Allowance Application in the visited network. This one provides the list of service available for roaming users belonging to the requesting home operator (this means the Local Service Allowance application in the visited network will implement the rules that determine which specific local services are offered to each requesting home operator). These services are sent in the form of IFCs. Different possibilities to request and send the IFCs for local services are shown in the section below entitled "Protocol Embodiments: Communication between Application servers in different networks".

(f) At this point, the Service Allowance Application in the home network dynamically updates the S-CSCF with the new IFCs to be used by the roaming user in the visited network. Different possibilities to update the S-CSCF with this information are shown in the section below entitled "Download local services".

(g) Once the S-CSCF is updated, the Service Allowance Application returns the session control to the S-CSCF following standard procedures.

(h) At this point the S-CSCF realizes it has to trigger a new service according to the new IFC to a new application server in the visited network offering the local service to the end user.

The next steps in the session flow would be as for any application offering a service according to IMS procedures.

One example of use could be the handling of short numbers by the local operator. Lets say that the local operator provide a short number, "111", to access a helpdesk. Of course, the IMS CN doesn't know how to route to this number and the home operator of the user doesn't know either the meaning of that number. The execution of a call to this short number according to an embodiment of the present invention would be as follows.

The following steps are described with reference to FIG. 13:

(a) After the registration the user starts a call to the "111" short number.

(b) S-CSCF is aware it has to contact an application service (according to download services in the registration process). The control of the call is passed to this application service, the Service Allowance application.

(c) The Service Allowance applications determines the user may access local services offered by the visited operator contacts the External Service Allowance application in the visited network and ask it for available local services.

(d) The External Service Allowance application, in the local network, determines that for the users belonging to the requesting operator, the Short Number service is available so that it sends the appropriate IFC.

(e) The Service Allowance application updates the user's S-CSCF with the received IFC. (See the section below entitled "Download local services")

(f) The control of the call is then returned to the S-CSCF.

(g) The S-CSCF is aware it has to contact an application server based on the IFC just downloaded. The control of the called is passed to this application service, the Short Number Application.

(h) The Short Number application translate the "111" number to the SIP or TEL URI of the helpdesk the user wanted to contact and returns the control of the call to the S-CSCF including that real SIP/TEL URI.

(i) Now the S-CSCF knows how to route the call the helpdesk in the local operator network.

Protocol Embodiments: Communication between Application servers in different networks FIG. 14 depicts two Application servers (so called Services Allowance Application and External Service Allowance Application) exchanging information, in particular, IFCs of local services that a roaming user may consume in the visited network. Four communication possibilities are outlined:

1. Via operation and maintenance. This mechanism would not appear in the flow and would be a pre-requisite. It is not considered further here.
2. Via specific XCAP (see [XCAP: The Extensible Markup Language (XML) Configuration Access protocol http://www.ietf.org/internet-drafts/draft-ietf-simple-xcap-05.txt]) messages for the purpose of XML document management.
3. Via SIP messages such as SIP INFO (see [RFC 2976. The SIP INFO method]) or other SIP methods (new methods could also be considered).
4. FTP, LDAP, SQL etc.

Only options 2 and 3 are considered here.

Download Local Services

Only two basic ways to download dynamically the IFCs corresponding to the local services will be considered here, since they are the more simple and direct solution but others may be considered as well.

Figure 15:
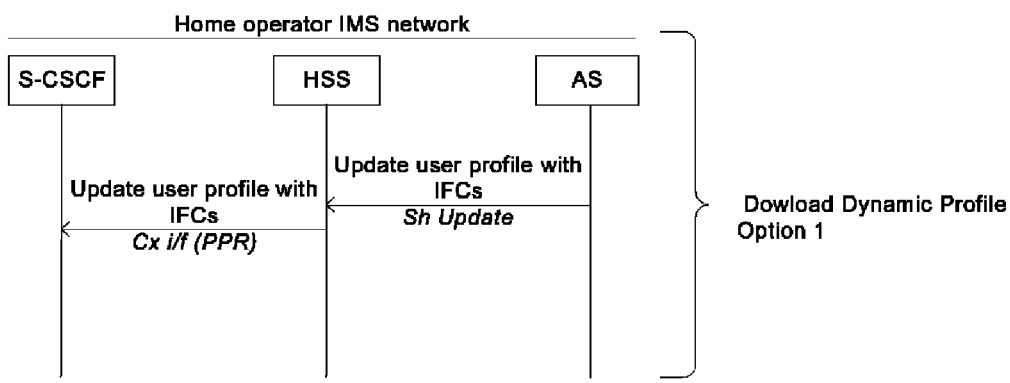
FIG. 15 illustrates one way to download dynamically local services IFCs in an embodiment of the present invention.

Option 1 (FIG. 15)

The Application Server uses Sh interface to update user profile in HSS. The operation to update user data in the HSS by an application server is standardized by 3GPP but it currently doesn't cover the updating of IFC information. Thus, it is proposed to use a standard mechanism with some modification in order to achieve the scope of update the S-CSCF user profile information.

The HSS updates S-CSCF with new IFC following standard procedures (use of Push Profile Request message on Cx interface).

Figure 16:
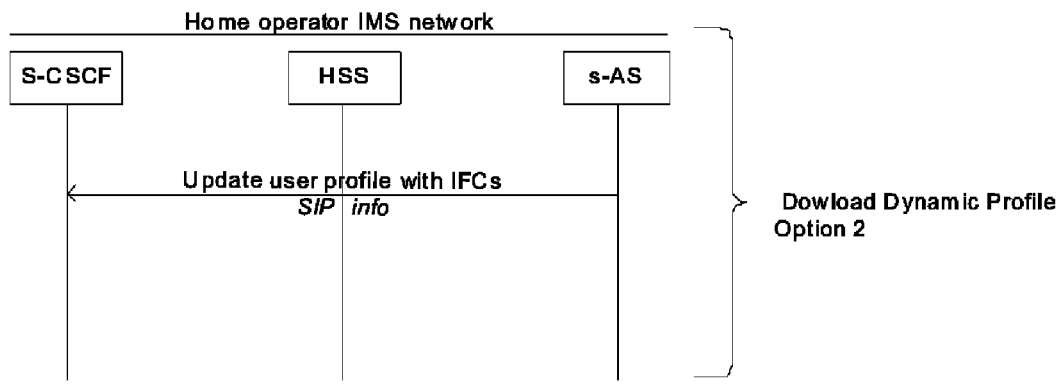
FIG. 16 illustrates another way to download dynamically local services IFCs in an embodiment of the present invention.

Option 2 (FIG. 16)

The application server updates directly the S-CSCF by means of a SIP INFO message, which includes the new IFCs.

The INFO method in SIP is used for communicating mid-session signalling information along the signalling path for the call. The INFO method is not used to change the state of SIP calls, nor does it change the state of sessions initiated by SIP. Rather, it provides additional optional information, which can further enhance the application that is using SIP.

Therefore this proposed procedure will not be using standard mechanism but adapting them in order to achieve the scope of update the S-CSCF user profile information.

A variation of this solution is when the s-AS of the Visited Network downloads or updates the S-CSCF in the home network directly.

Information Stored in S-CSCF

Table 2 below shows the state information that is now stored in the S-CSCF for roaming users with the new column added at the end (After Interaction with the Visited Network), in case the IFCs of the visited network are obtained dynamically. This new table would have to be introduced in 3GPP in place of the Table 1 described above.

TABLE 2

| Node | Before Registration | During Registration | After Registration | After Interaction with the Visited Network OR External Domain |
|---|---|---|---|---|
| Serving-CSCF (Home) | No state information | HSS Address/name User profile (limited - as per network scenario) Proxy address/name P-CSCF Network ID Public/Private User ID UE IP Address | May have session state Information Same as during registration | IFCs of services offered by Visited Network or External Domain. May have session state Information Same as during registration |

Note that the IFCs of the visited network or external domain can be provisioned in the S-CSCF as explained above in the Summary of the Invention section. In that case the IFCs of the visited network or external domain would be included in the user's state information under the "During Registration" column. Note that the IFCs belonging to ALL possible visited networks or external domain would be provisioned in the S-CSCF, however only those IFCs related to the Visited network or external domain where the user is currently roaming (e.g. obtained via P-CSCF Network ID or similar) would be included in the user's state information during registration. Table 3 would also replace the current table in 3GPP 23.228 outlined above in Table 1. However, this option is not as advantageous and is less optimal than the previous solution.

TABLE 3

| Node | Before Registration | During Registration | After Registration |
|---|---|---|---|
| Serving-CSCF (Home) | No state information | HSS Address/name User profile (limited - as per network scenario) IFCs of visited Network or External Domain. Proxy address/name P-CSCF Network ID Public/Private User ID UE IP Address | May have session state Information Same as during registration |

Advantages of the Invention

IFCs can be defined for services that affect groups of users, such as users that are roaming, without being included in their user profiles in the HSS.

IFCs can be downloaded dynamically if certain conditions are fulfilled (e.g. if user is roaming and is allowed to consume local services in a visited network) to a serving entity (S-CSCF).

An IMS user is able to profit from the use of services in a visited network in case of a roaming situation (IMS roaming).

The IMS home operator keeps control the access to the external services offered by the external domain. Thus the home operator is still controlling the user access to different services.

On the other hand, the external domain controls the services provided to the users based on the home operator that said users belong to on real time. Thus, the external domain has the control of the services offered to users at any moment.

At least the following services can now be offered to IMS roaming users:

Roaming users can dial numbers/identities in formats that are specific to the visited network without the home network returning an error or similar.

Visited networks can optimise resources when handling payloads. For instance, an Application server in the visited network (e.g. the LSA) can assign a Media Resource Function (MRF) belonging to the visited network.

As a result of network resource optimisation, the visited network can offer better rates to roaming users in their network that communicate with subscribers that belong to the local visited network. For instance, the communication could be charged as a local call instead of an international call to the roaming user.

Any other service that the visited network offers to its subscribers can be offered in the same format to roaming users (i.e. same look and feel) without the Home Network interrupting.

An embodiment of the present invention provides:

Applications to control the execution of local service execution, both in the home operator and the local operator (each on has a specific role).

Communication between application services in different networks in order to agree on a final service to be provided to a user.

Downloading dynamically the IMS service information (IFC)

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the present invention as defined by the appended claims. In particular, it will be appreciated that, although described in relation to a Universal Mobile Telecommunications System having an IP Multimedia Subsystem, the present invention is also applicable to other types of network.

What is claimed is:

1. A method in a telecommunications network for triggering services provided to a user roaming in an external domain, said method comprising the steps of:
   obtaining by a service control node in a home network of the user, filter criteria associated with the external domain, wherein the filter criteria are for local services provided to roaming users in the external domain;
   selecting by the service control node, at least one filter criterion from the filter criteria associated with the external domain for use at the service control node based upon the criterion's relevance to the user, wherein the relevance is determined based upon at least one of:
      the ability of the user to consume the service;
      the user's location;
      network-related information; and
      the capabilities of the user's communication device; and
   triggering a service provided to the user utilizing the at least one filter criterion.

2. The method according to claim 1, wherein the at least one filter criterion associated with the external domain is associated with a Value Added Service Provider residing in the external domain.

3. A method in a service control node in a home telecommunications network of a user for triggering services provided to the user, said method comprising the steps of:
   downloading by the service control node, filter criteria from a user profile of the user during a user registration process, the filter criteria defining which application servers are to be accessed for user services when the user is operating in the home network;
   utilizing at least one of the downloaded filter criteria to provide the user with a requested service when the user is operating in the home network;
   detecting by the service control node that the user has roamed to a visited network;
   in response to detecting that the user has roamed to the visited network, obtaining by the service control node, filter criteria from the visited network, wherein the filter criteria from the visited network are for services provided to roaming users in the visited network; and
   utilizing at least one of the filter criteria from the visited network to provide the user with a requested service when the user is operating in the visited network.

4. The method according to claim 1, wherein the network is an IP Multimedia Subsystem (IMS) network and the service control node comprises a Serving Call Session Control Function (S-CSCF).

5. An apparatus in a home telecommunications network of a user for triggering services provided to the user when the user is operating in an external domain, wherein the apparatus is configured to:
   detect that the user has roamed to the external domain;
   in response to detecting that the user has roamed to the external domain, obtain filter criteria associated with the external domain, wherein the filter criteria are for local services provided to roaming users in the external domain;
   select at least one filter criterion from the filter criteria associated with the external domain for use at a service control node based upon the criterion's relevance to the user, wherein the relevance is determined based upon at least one of:
      the ability of the user to consume the service;
      the user's location;
      network-related information; and
      the capabilities of the user's communication device; and
   trigger a service provided to the user utilizing the at least one filter criterion.

6. The method according to claim 3, wherein the step of downloading the filter criteria from the user profile includes:
   retrieving the filter criteria by a node other than the service control node; and
   sending the retrieved filter criteria to the service control node.

7. An apparatus in a home telecommunications network of a user for triggering services provided to the user, wherein the apparatus is configured to:

download filter criteria from a user profile of the user during a user registration process, the filter criteria defining which application servers are to be accessed for user services when the user is operating in the home network;

utilize at least one of the downloaded filter criteria to provide the user with a requested service when the user is operating in the home network;

detect that the user has roamed to a visited network;

in response to detecting that the user has roamed to the visited network, obtain filter criteria from the visited network, wherein the filter criteria from the visited network are for services provided to roaming users in the visited network; and utilize at least one of the filter criteria from the visited network to provide the user with a requested service when the user is operating in the visited network.

* * * * *

UNITED STATES PATENT AND TRADEMARK OFFICE
CERTIFICATE OF CORRECTION

PATENT NO. : 8,249,562 B2  Page 1 of 1
APPLICATION NO. : 12/524031
DATED : August 21, 2012
INVENTOR(S) : Walker et al.

It is certified that error appears in the above-identified patent and that said Letters Patent is hereby corrected as shown below:

In Fig. 15, Sheet 12 of 12, delete "Dowload Dynamic Profile" and insert
-- Download Dynamic Profile --, therefor.

In Fig. 16, Sheet 12 of 12, delete "Dowload Dynamic Profile" and insert
-- Download Dynamic Profile --, therefor.

In Column 6, Line 29, delete "Visted Networks's" and insert -- Visited Network's --, therefor.

In Column 9, Line 26, delete "hereinafter" and insert -- (hereinafter --, therefor.

Signed and Sealed this
Twelfth Day of February, 2013

Teresa Stanek Rea
*Acting Director of the United States Patent and Trademark Office*